US009409259B2

(12) United States Patent
Wallin et al.

(10) Patent No.: US 9,409,259 B2
(45) Date of Patent: *Aug. 9, 2016

(54) WELDING COMPOSITIONS FOR IMPROVED MECHANICAL PROPERTIES IN THE WELDING OF CAST IRON

(75) Inventors: Jack Garry Wallin, Scottsville, KY (US); Ravi Menon, Goodlettsville, TN (US)

(73) Assignee: Stoody Company, Chesterfield, MO (US)

(*) Notice: Subject to any disclaimer, the term of this patent is extended or adjusted under 35 U.S.C. 154(b) by 1884 days.

This patent is subject to a terminal disclaimer.

(21) Appl. No.: 11/113,404

(22) Filed: Apr. 22, 2005

(65) Prior Publication Data

US 2006/0237412 A1 Oct. 26, 2006

(51) Int. Cl.

*B23K 35/22* (2006.01)
*B23K 35/30* (2006.01)
*B23K 35/365* (2006.01)

(52) U.S. Cl.

CPC ........... *B23K 35/3033* (2013.01); *B23K 35/365* (2013.01); *Y10T 403/477* (2015.01)

(58) Field of Classification Search

CPC .... B23K 35/3033; B23K 35/365; B23K 9/23; B23K 35/30; C22C 38/32; C22C 38/22; C22C 38/24; C22C 38/26; C22C 38/28; C22C 38/38; C22C 38/54; C22C 38/005; C22C 38/06; F16L 9/02

USPC ............ 219/137 WM, 146.1, 145.23, 146.23, 219/146.24; 420/441–460; 148/426, 24; 228/101, 119

See application file for complete search history.

(56) References Cited

U.S. PATENT DOCUMENTS 427,205 A * 5/1890 Marbeau ........................ 104/196
1,580,662 A * 4/1926 Girin ............................... 420/94
1,708,815 A * 4/1929 Wille ....................... 219/146.24
1,794,983 A * 3/1931 Ritter ......................... 219/145.1
1,838,130 A * 12/1931 Beckinsale ..................... 420/82
2,108,050 A * 2/1938 Egeberg et al. ............... 420/587
2,133,291 A * 10/1938 Gordon ......................... 228/118
2,266,762 A 12/1941 Jerabek
2,499,827 A * 3/1950 Kihlgren ....................... 428/561
2,529,346 A * 11/1950 Millis et al. ..................... 420/20

(Continued)

FOREIGN PATENT DOCUMENTS

DE 2437247 B * 9/1975
GB 783 387 9/1957

(Continued)

OTHER PUBLICATIONS

International Search Report.

*Primary Examiner* — Phuong Nguyen

(57) ABSTRACT

A weld deposit produced from a coated welding electrode for use in welding cast irons is provided by the present invention. Preferably, in one form of the present invention, the weld deposit composition comprises between approximately 54% and approximately 60% Nickel, between approximately 3.5% and approximately 5.5% Manganese, and between approximately 0.9% and approximately 1.4% Carbon. The weld deposit is preferably formed by using a coated welding electrode having a coating composition between approximately 0.3% and approximately 4.0% Magnesium and rare earth metals and oxides. The resulting weld deposit exhibits improved ductility, fracture toughness, and resistance to cracking.

3 Claims, 4 Drawing Sheets

(56) References Cited

U.S. PATENT DOCUMENTS 2,626,339 A * 1/1953 Wasserman .............. 219/146.52
2,798,826 A * 7/1957 Klement ....................... 148/553
2,805,152 A * 9/1957 Sherwin ......................... 420/26
2,855,333 A 10/1958 Wasserman et al.
2,856,281 A * 10/1958 Cremer et al. ................ 420/434
2,880,086 A * 3/1959 Cape ............................ 420/459
2,973,428 A * 2/1961 Pfeiffer et al. ............ 219/137 R
3,108,020 A 10/1963 Willigen et al.
3,145,466 A * 8/1964 Feduska ........................ 228/194
3,196,537 A * 7/1965 Groman et al. ............... 228/165
3,231,709 A 1/1966 Foley
3,259,970 A * 7/1966 Fujimori et al. .............. 228/224
3,282,689 A * 11/1966 Santner ......................... 420/458
3,309,243 A * 3/1967 Corrigan ....................... 148/524
3,334,996 A 8/1967 Foster et al.
3,404,999 A * 10/1968 Rogers et al. ................. 428/563
RE26,755 E * 1/1970 Pfeiffer ..................... 219/137 R
3,582,408 A * 6/1971 Onyshkevych ................. 420/73
3,663,214 A 5/1972 Moore et al.
3,720,504 A * 3/1973 Frehn ............................. 75/237
3,778,588 A * 12/1973 Bishel ...................... 219/146.52
3,801,311 A * 4/1974 Church et al. ................ 420/405
3,843,356 A * 10/1974 Renschen et al. ............. 420/441
3,851,142 A 11/1974 Bishel
3,851,143 A 11/1974 Bishel
3,876,856 A * 4/1975 Bouvard .................... 219/146.1
3,909,253 A * 9/1975 Asnis et al. ................... 420/455
3,919,519 A * 11/1975 Petersen ................... 219/137 R
3,948,615 A * 4/1976 Gray ............................ 428/328
3,986,867 A 10/1976 Masumoto et al.
3,995,139 A * 11/1976 Bouvard .................. 219/146.51
4,043,843 A 8/1977 Tanczyn
4,052,203 A * 10/1977 Larson et al. ................... 420/25
4,087,673 A * 5/1978 Kiilunen ............... 219/137 WM
4,103,067 A 7/1978 Jackson et al.
4,111,691 A * 9/1978 Larson et al. ................. 420/581
4,122,817 A 10/1978 Matlock
4,225,768 A 9/1980 Seifahrt
4,251,711 A * 2/1981 Tanigaki et al. ......... 219/146.24
4,294,614 A 10/1981 Kotecki
4,394,560 A * 7/1983 Kishida et al. ........ 219/137 WM
4,396,822 A 8/1983 Kishida et al.
4,415,530 A 11/1983 Hunt
4,426,426 A * 1/1984 Muhlberger .................. 428/682
4,426,428 A 1/1984 Kammer et al.
4,534,793 A * 8/1985 Olson et al. ....................... 420/9
4,726,854 A * 2/1988 Olson et al. ..................... 148/24
4,772,773 A * 9/1988 Hashimoto et al. ...... 219/121.64
4,790,473 A * 12/1988 Narasimhan et al. ......... 228/206
4,817,859 A * 4/1989 Breitenmoser et al. ....... 228/226
4,994,640 A * 2/1991 Kiser ...................... 219/145.22
5,091,624 A * 2/1992 Alt et al. ....................... 219/100
5,304,346 A * 4/1994 O'Donnell et al. ........... 420/580
5,422,071 A * 6/1995 Kiser ............................. 420/73
6,242,113 B1 * 6/2001 Kiser ............................ 428/680
6,406,563 B2 * 6/2002 Kawano et al. ............... 148/324
6,589,671 B1 * 7/2003 Kehrer .......................... 428/683
6,949,216 B2 * 9/2005 Brice et al. .................... 264/401
2006/0237412 A1 * 10/2006 Wallin et al. .......... 219/137 WM

FOREIGN PATENT DOCUMENTS

GB 1471964 A * 4/1977
JP 5 237691 9/1993
PL 280 768 1/1991
RU 2 167 752 5/2001
SU 622 609 9/1978

* cited by examiner

WELDING COMPOSITIONS FOR IMPROVED MECHANICAL PROPERTIES IN THE WELDING OF CAST IRON

FIELD OF THE INVENTION

The present invention relates generally to welding electrodes and more particularly to weld deposit compositions that result in improved toughness, ductility, and resistance to cracking in the welding of cast irons.

BACKGROUND OF THE INVENTION

Cast irons, a group of iron alloys containing over 2% Carbon, among other elements, are often used to form parts or components that subsequently undergo welding processes. The welding of cast irons presents certain issues relative to forming a welded structure that exhibits a sufficient level of mechanical properties such as toughness, ductility, and resistance to cracking, among others. For example, carbides often form in a fusion zone and a mixed zone of the weld and produce a weld deposit with reduced ductility and lower strength. Additionally, it is desirable to form austenite rather than martensite in the mixed zone since austenite reduces the formation of carbides. Like carbides, martensite reduces the ductility and strength of the weld and also becomes more brittle than the surrounding material.

Additionally, the amount of arc energy required to form a fusion zone directly affects the amount of carbides that can form. Generally, a higher amount of arc energy causes more heating of the base metal, which increases the penetration of the weld metal into the cast iron base metal. The deeper the penetration, the higher the carbon content and thus an increased amount of carbide formation at the weld interface.

Accordingly, a need exists in the art for welding electrodes and weld deposit compositions that result in improved ductility, fracture toughness, and resistance to cracking, among others, in the welding of cast iron.

SUMMARY OF THE INVENTION

In one preferred form, a weld deposit produced from a coated welding electrode for use in welding cast irons is provided, the weld deposit composition comprising between approximately 54% and approximately 60% Nickel, between approximately 3.5% and approximately 5.5% Manganese, and between approximately 0.9% and approximately 1.4% Carbon. Further, the coated welding electrode comprises a coating composition comprising between approximately 0.3% and approximately 4.0% Magnesium and rare earth metals and oxides.

In another form, a weld deposit produced from welding cast irons is provided, the weld deposit composition comprising at least approximately 54% Nickel and being formed from a welding core wire comprising approximately 50% Nickel and approximately 50% Iron.

In other forms, a cast iron weld structure, a method of welding cast iron, and a welding wire for use in welding cast iron are provided, wherein a weld deposit is produced having a composition comprising at least approximately 54% Nickel and being formed from a welding core wire comprising approximately 50% Nickel and approximately 50% Iron.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying photomicrographs, wherein.

Corresponding reference numerals indicate corresponding parts throughout the several views of the drawings.

DETAILED DESCRIPTION OF THE PREFERRED EMBODIMENTS

The following description of the preferred embodiments is merely exemplary in nature and is in no way intended to limit the invention, its application, or uses.

Figure 1:
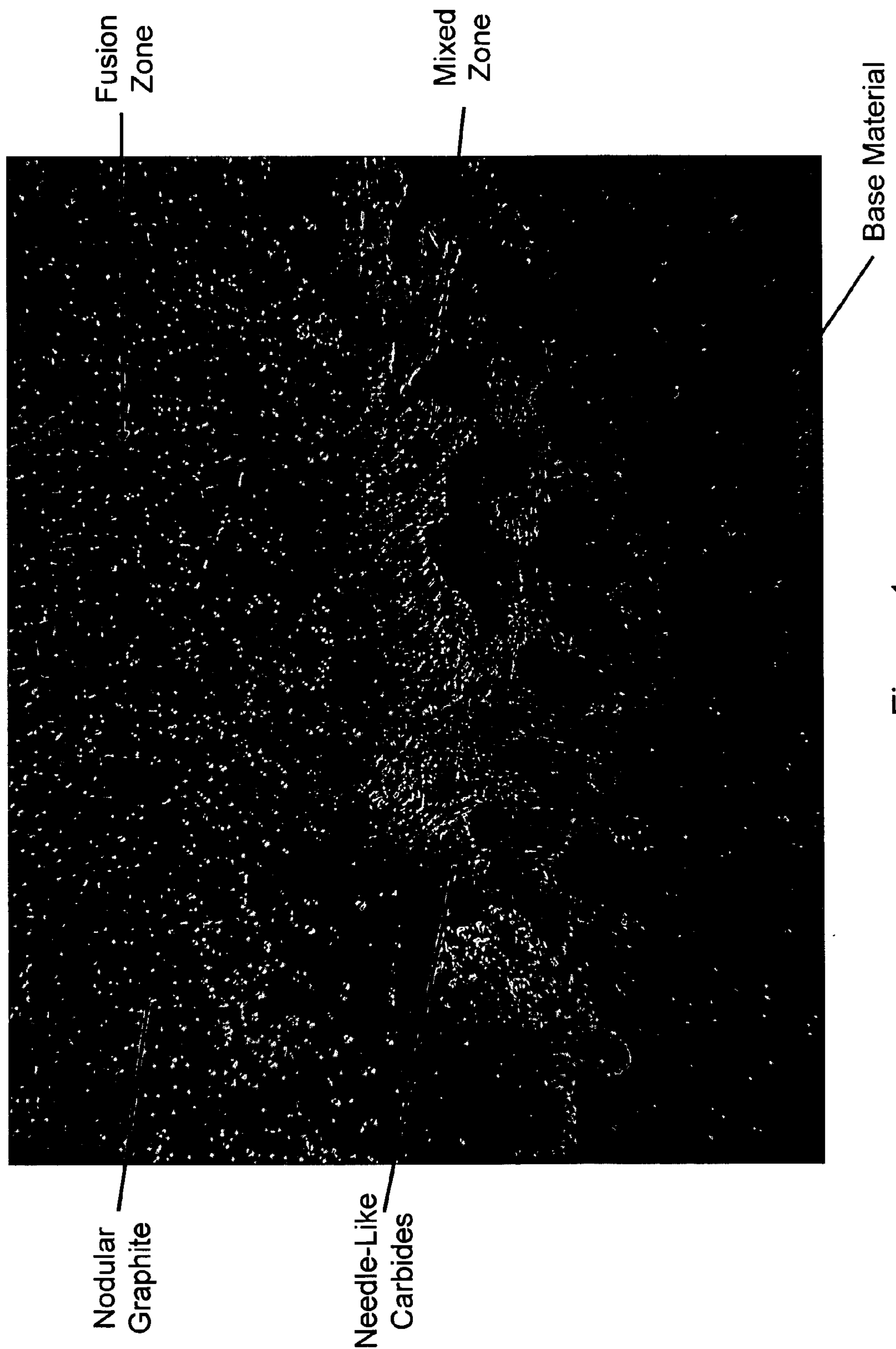
FIG. 1 is a photomicrograph of a prior art cast iron weld deposit illustrating needle-like carbides in the mixed zone.
Figure 2:
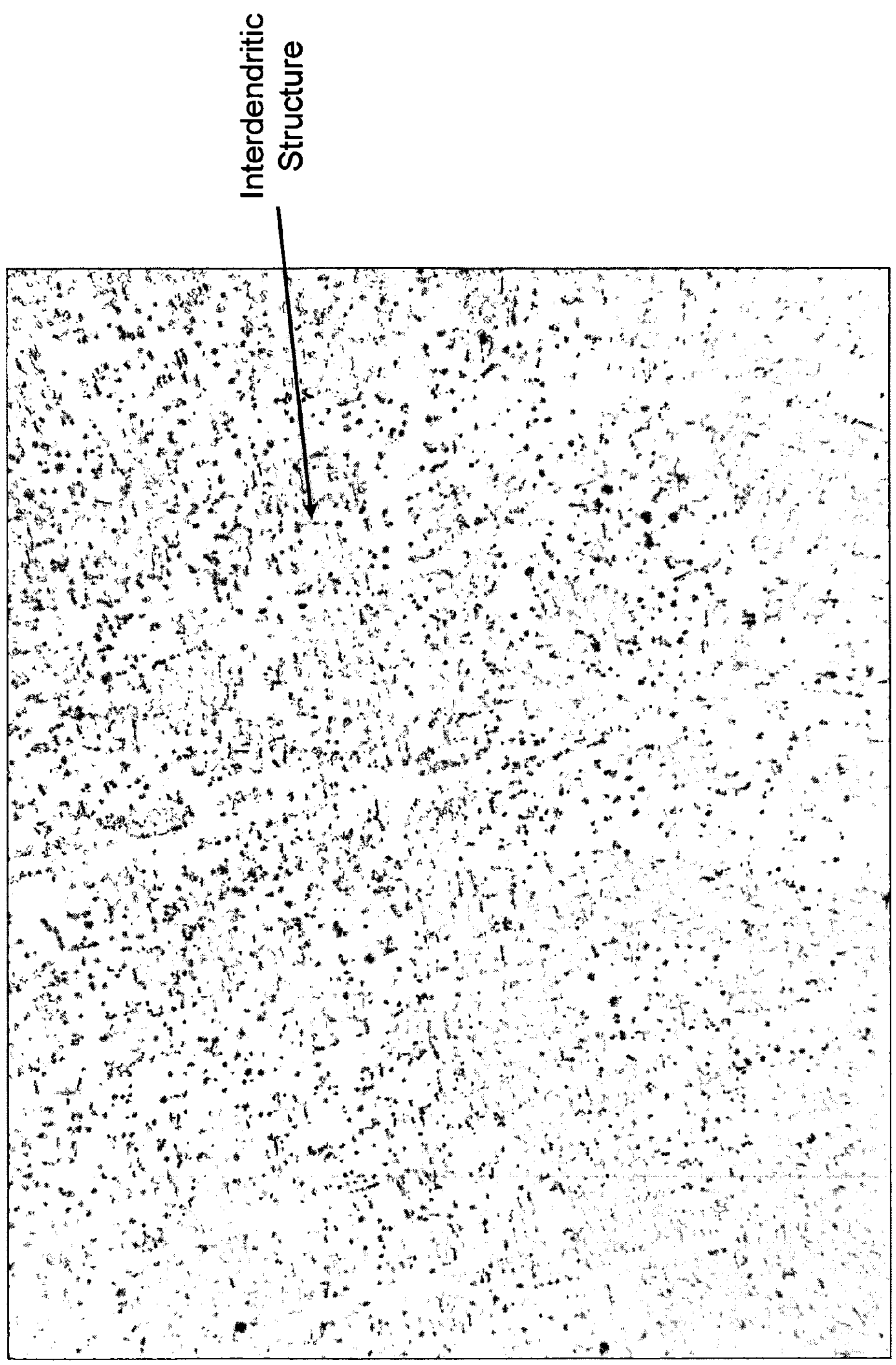
FIG. 2 is a photomicrograph of another prior art cast iron weld deposit illustrating an interdendritic structure.

Referring to FIGS. 1 and 2, prior art cast iron weld deposits are illustrated, wherein undesirable carbides and an interdendritic structure are formed near a weld. FIG. 1 illustrates undesirable needle-like carbides formed in the mixed zone, just above the base material, which reduces ductility and strength of the weld. Above these carbides is the fusion zone, in which nodular graphite is formed, which is desirable in a weld. However, the carbide formation is not desirable. FIG. 2 illustrates an interdendritic structure in the fusion zone of a cast iron weld. This interdendritic structure is also undesirable and reduces the strength and toughness of the weld.

In accordance with the principles of the present invention, a coated welding electrode for use in welding cast iron is provided that produces a weld deposit having improved ductility, fracture toughness, and resistance to cracking. Preferably, the coated welding electrode comprises a core wire having approximately 50% Nickel (Ni) and approximately 50% Iron (Fe). The core wire is coated with a composition comprising between approximately 0.3% and approximately 4.0% Magnesium (Mg), and rare earth metals and oxides. Since it is desirable that the weld deposit microstructure contain nodular graphite rather than an interdendritic structure, the Magnesium and rare earth elements in the coating composition act as nodularizing agents. Such a nodular microstructure improves the impact toughness of the weld deposit.

The resulting weld deposit composition comprises a minimum of approximately 54% Nickel and preferably between approximately 54% Nickel and approximately 60% Nickel. Additionally, the weld deposit composition comprises a minimum of approximately 3.0% Manganese (Mn) and preferably between approximately 3.5% Manganese and approximately 5.5% Manganese. Further, the weld deposit composition comprises a minimum of approximately 0.7% Carbon (C) and preferably between approximately 0.9% Carbon and approximately 1.4% Carbon.

Figure 3:
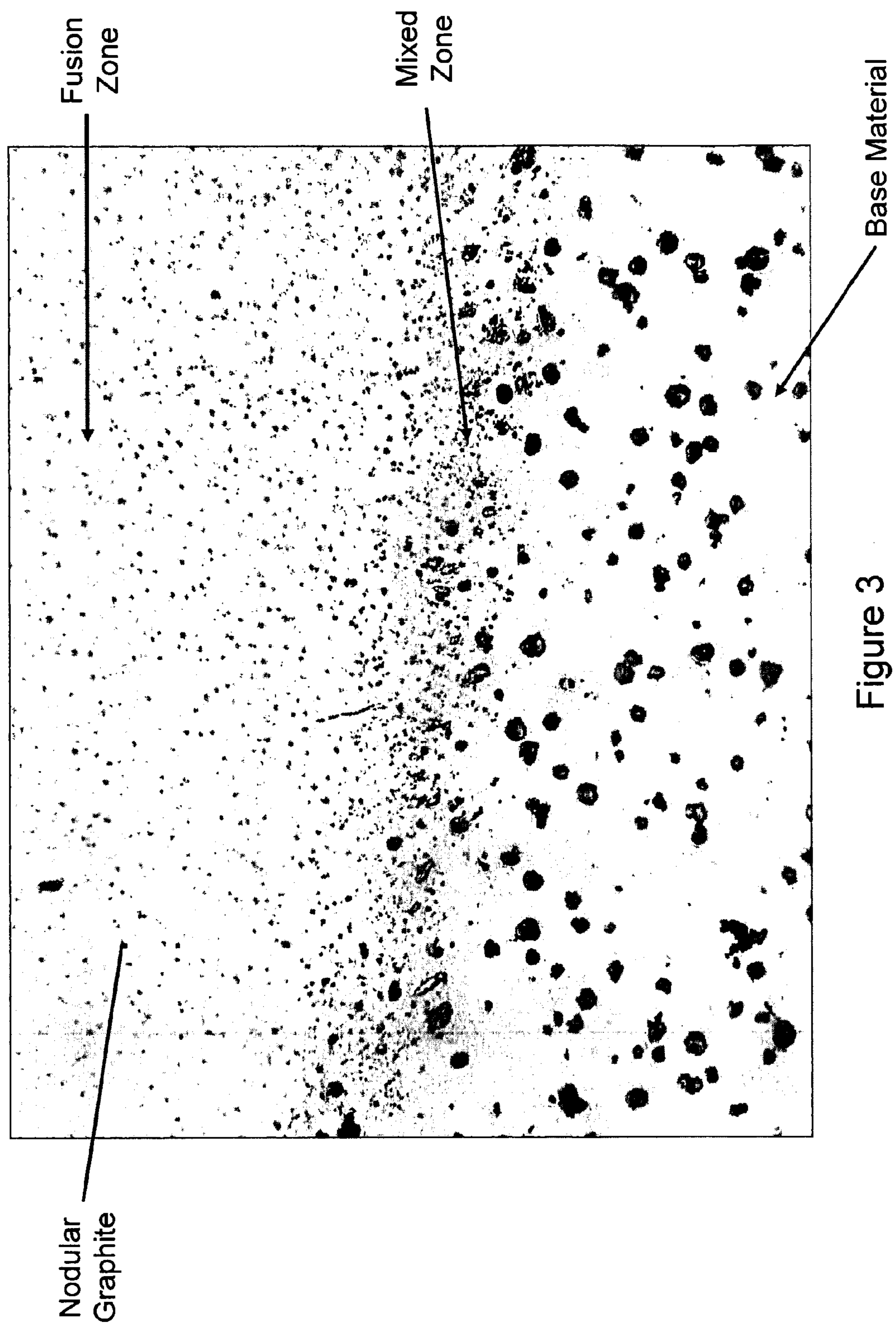
FIG. 3 is a photomicrograph of a cast iron weld deposit illustrating a carbide-free fusion zone in accordance with the principles of the present invention.
Figure 4:
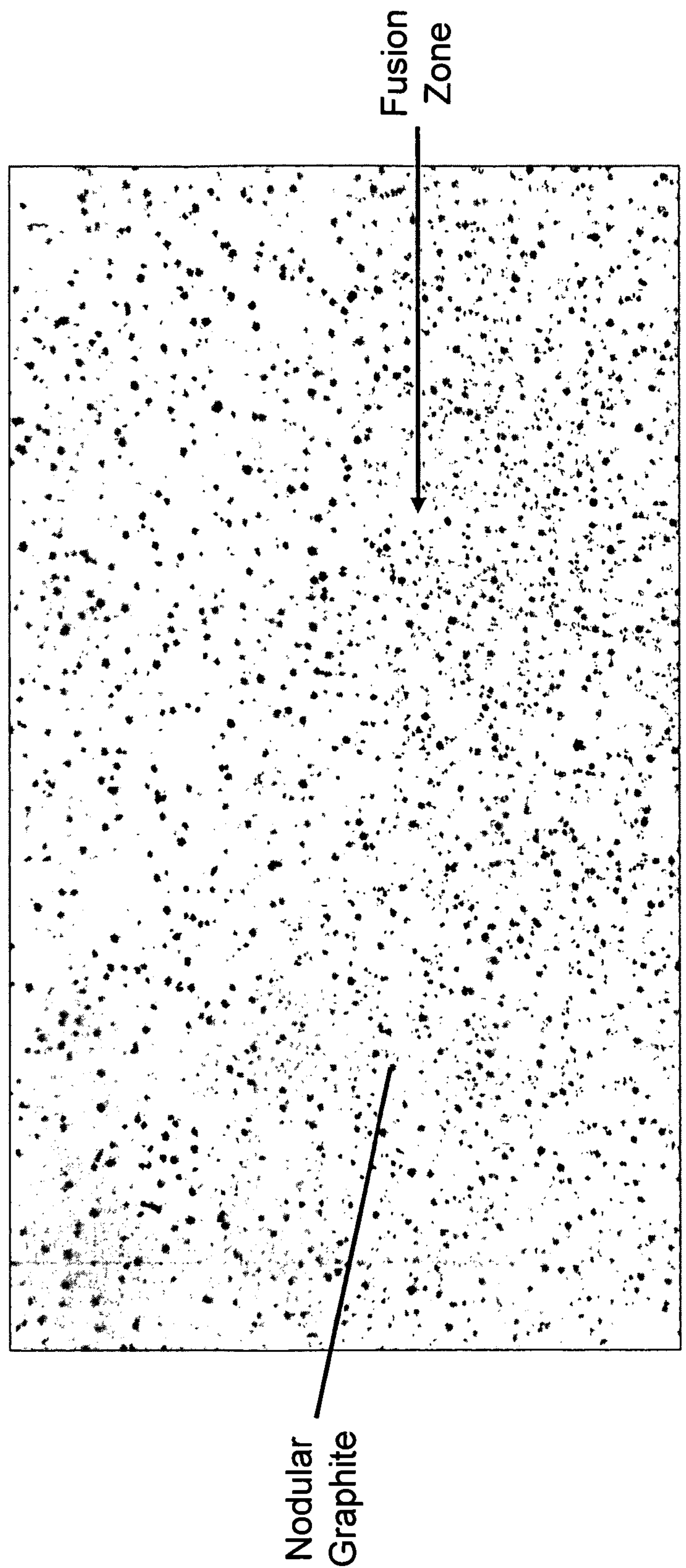
FIG. 4 is a photomicrograph of the fusion zone of the cast iron weld deposit of FIG. 3 illustrating nodular graphite in accordance with the principles of the present invention.

Referring to FIGS. 3 and 4, exemplary weld deposits according to the present invention are shown. As illustrated, the weld deposits are carbide-free in the fusion zone and the mixed zone, and throughout the weld structure. As further shown, the weld deposits do not exhibit an interdendritic structure, and instead, exhibit a high degree of nodular graphite. As shown in FIG. 3, the fusion zone does not contain any needle-like carbides as previously shown. Rather, the structure is nodular, which results in improved ductility and strength of the weld. FIG. 4 further illustrates the nodular graphite structure in the fusion zone. As illustrated by the carbide-free and nodular graphite structure, an improved weld deposit is provided in accordance with the teachings of the present invention.

Since Nickel is an austenitic phase stabilizer and austenite absorbs carbon rejected by the melted cast iron in the weld zone, the presence of Nickel reduces the amount of carbides formed in the weld. The addition of Manganese produces an austenite weld deposit, which also reduces the amount of carbides formed in the weld. Accordingly, the weld deposit has improved toughness, ductility, and strength.

In this preferred form, the weld deposit composition further comprises approximately 0.5% Silicon (Si), less than approximately 0.03% Sulfur (S), less than approximately 0.2% Copper (Cu), less than approximately 0.5% Aluminum (Al), and the remainder Iron. Silicon is added as a graphitizing agent, which improves weld metal ductility. Aluminum is added as a deoxidizer, and Sulfur and Copper are elements that are not intentionally added.

The resulting weld deposit is summarized below in Table I:

TABLE I

| | Ni | Mn | C | Si | S | Fe | Cu | Al |
|---|---|---|---|---|---|---|---|---|
| % by weight | 54-64 | 3.5-5.5 | 0.9-1.4 | 0.5 | <0.03 | Rem. | <0.2 | <0.5 |

The welding electrode according to the present invention produces weld deposits in cast irons with greatly enhanced physical properties such as strength and toughness. For example, the weld deposits according to the present invention result in a Charpy V-Notch impact strength of approximately 10-15 foot-pounds, while standard welding electrodes produce weld deposits having a Charpy V-Notch impact strength of approximately 1-9 foot-pounds. A summary of improved weld deposit properties provided by the present invention is provided below in Table II, which are intended to be exemplary only and are not intended to limit the scope of the present invention.

TABLE II

| | Ultimate Tensile Strength | Yield Strength | Elongation | Charpy Impact Strength |
|---|---|---|---|---|
| Preferred Embodiment | 70 ksi | 51 ksi | 8.0% | 12.5 ft-lbs. |
| Typical Electrode | 52 ksi | 48 ksi | 2.0% | <5.0 ft-lbs. |

Accordingly, the compositions according to the present invention result in improved mechanical properties through the reduction in the formation of carbides through the increased amount of Nickel to serve as an austenitic phase stabilizer. Furthermore, the addition of Manganese also produces an austenitic weld deposit, thus reducing the formation of carbides. The coated electrode composition furthermore reduces the arc energy required to weld, which also reduces the formation of carbides. Moreover, the ratio of nodularizing agents, graphitizing agents, and Carbon aid in the formation of nodular graphite, thus producing a less brittle weld deposit.

The coated electrode and weld deposit according to the present invention is preferably used in shielded metal arc welding (SMAW), although other welding processes such as gas metal arc welding (GMAW), submerged arc welding (SAW), and flux core arc welding (FCAW), among others, may also be employed while remaining within the scope of the present invention.

The description of the invention is merely exemplary in nature and, thus, variations that do not depart from the gist of the invention are intended to be within the scope of the invention. For example, the weld deposit according to the teachings of the present invention may be produced from welding wire types other than coated electrodes, such as flux core wire, while remaining within the scope of the present invention. Such variations are not to be regarded as a departure from the spirit and scope of the invention.

What is claimed is:

1. A weld deposit produced from a coated welding electrode for use in welding cast irons, the weld deposit composition comprising:

between 54% and 60% nickel;

between 3.5% and 5.5% manganese;

between 0.9% and 1.4% carbon, the carbon being present as nodular graphite;

approximately 1.0% silicon;

approximately 0.03% sulfur;

approximately 0.2% copper;

approximately 0.5% aluminum; and between approximately 33.0% and approximately 41.5% iron;

wherein the coated welding electrode comprises a coating composition comprising between 0.3% and 4.0% magnesium and rare earth metals and oxides;

wherein a percentage of nickel in the weld deposit composition is greater than a percentage of nickel in a welding electrode core from which the weld deposit is formed.

2. The weld deposit composition according to claim 1, wherein the coated welding electrode further comprises a core wire having approximately 50% nickel and approximately 50% iron.

3. A weld deposit composition essentially consisting of:

between approximately 54% and approximately 60% nickel;

between approximately 3.5% and approximately 5.5% manganese;

between approximately 0.9% and approximately 1.4% carbon;

approximately 1.0% silicon;

approximately 0.03% sulfur;

approximately 0.2% copper;

approximately 0.5% aluminum; and between approximately 33.0% and approximately 41.5% iron;

wherein the weld deposit is carbide-free and the carbon is present in the form of nodular graphite;

wherein the weld deposit composition contains a greater percentage of nickel than is in the coated welding electrode from which it is formed.

* * * * *